2 Sheets—Sheet 1.

C. PHILLIPS.

Assignor of two-thirds to G. J. FOREACRE and J. B. TRAVIS.

STEAM AND AIR BRAKE.

No. 10,564. Reissued Feb. 24, 1885.

WITNESSES:

Franklin H. Hough

INVENTOR:

Columbus Phillips, by Chas. G. Henderson,

Attorney

N. PETERS, Photo-Lithographer, Washington, D. C.

C. PHILLIPS.

Assignor of two-thirds to G. J. FOREACRE and J. B. TRAVIS.

STEAM AND AIR BRAKE.

No. 10,564. Reissued Feb. 24, 1885.

WITNESSES:

Wm. H. Hudson.

Franklin H. Hough

INVENTOR

Columbus Phillips, by Wm. G. Henderson,

Attorney

N. PETERS, Photo-Lithographer, Washington, D. C.

UNITED STATES PATENT OFFICE.

COLLUMBUS PHILLIPS, OF ATLANTA, GEORGIA, ASSIGNOR OF TWO-THIRDS TO GREEN J. FOREACRE AND JOSEPH B. TRAVIS, OF SAME PLACE.

STEAM AND AIR BRAKE.

SPECIFICATION forming part of Reissued Letters Patent No. 10,564, dated February 24, 1885.

Original No. 307,492, dated November 4, 1884. Application for reissue filed February 3, 1885.

*To all whom it may concern:*

Be it known that I, COLLUMBUS PHILLIPS, a citizen of the United States, residing at Atlanta, in the county of Fulton and State of Georgia, have invented certain new and useful Improvements in Steam and Air Brakes, of which the following is a specification, reference being had therein to the accompanying drawings.

My invention relates to atmospheric air-brakes used on railways, and has for its object to effectually prevent the sticking of the piston in the brake-cylinder when the brakes are taken off, and consequently the necessity of "bleeding" the brake-cylinder, as heretofore, to effect the release of the piston; and to that end it consists in completely, so far as effecting the release is concerned, exhausting the air from the said cylinder at the time that the brakes are taken off by means under the control of the engineer without leaving his cab, of which an illustration will be given in the accompanying drawings, and particularly described in the following description.

Figure 1:
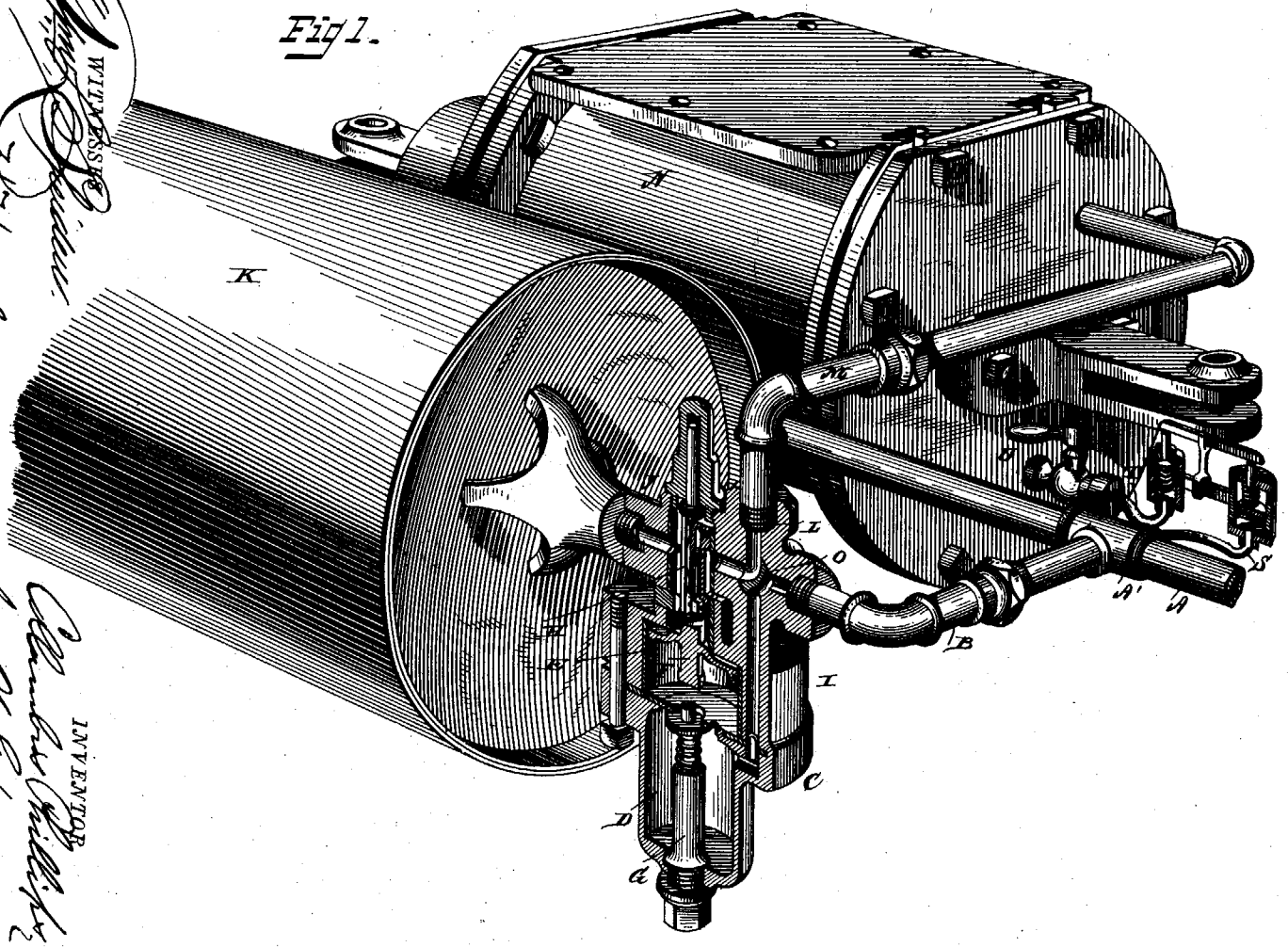
Figure 2:
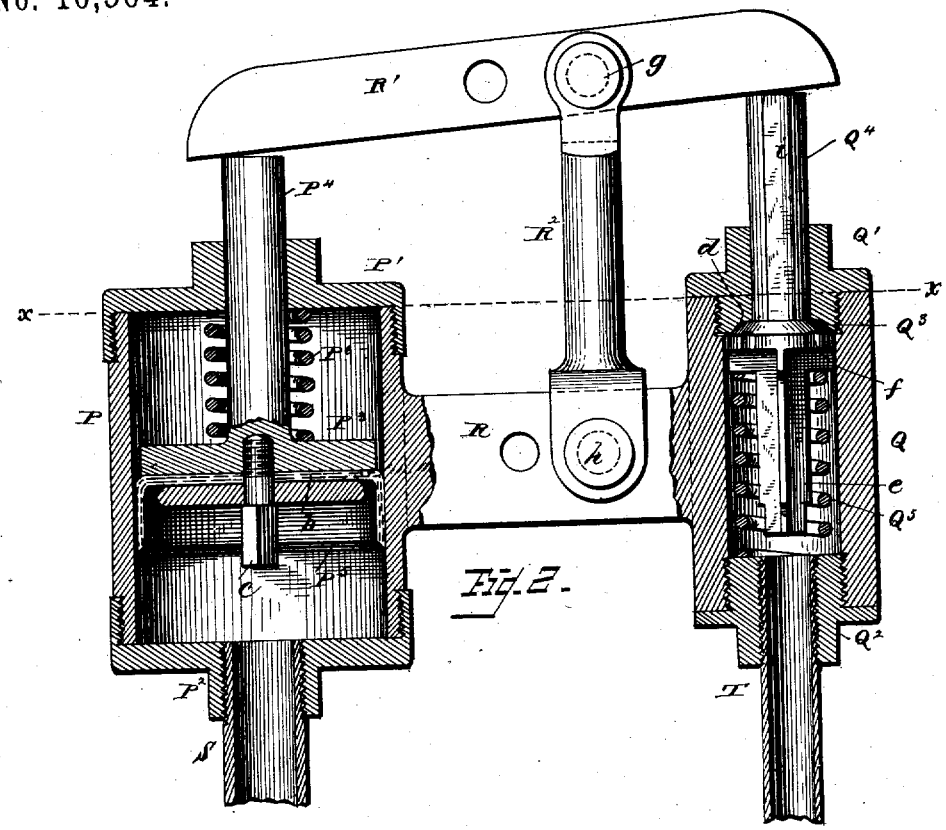
Figure 3:
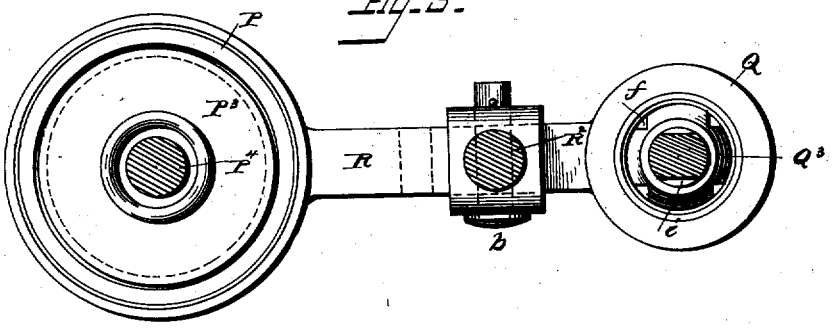
Figure 4:
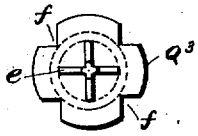

In the drawings, Figure 1 is a perspective of the auxiliary reservoir, (broken in two,) brake-cylinder, and triple valve of a Westinghouse air-brake with my attachment applied thereto, some of the parts being in section. Fig. 2 is an enlarged view in elevation of my release attachment in vertical section. Fig. 3 is a plan view on the line *x x* of Fig. 2; Fig. 4, a bottom view of valve in the brake-release chamber.

In the accompanying drawings, the letter A indicates the main brake-pipe connected by a branch pipe, B, with the triple valve C, formed with two chambers, D and E, in which work the piston F and stem G, and slide-valve H, the casing or shell I of the triple valve being formed, in addition to the port for the main brake-pipe, with the port J for the auxiliary reservoir K, and the port L for the pipe M, leading to the brake-cylinder N; also, with the four-way cock O, and other usual features, as illustrated, of the triple valve in general use in the Westinghouse air-brake. These parts so far generally referred to are of well-known construction, and operate in the usual well-known way, and therefore need not be more particularly described.

Under the construction referred to, while the air is exhausted from the brake-cylinder to release the brakes, still, at times, from the air not being completely exhausted, the brake will stick, and it then becomes necessary to go to the cylinder and turn a cock, so as to "bleed" the cylinder before the brake will release. The inconvenience and disadvantages attending such necessary steps are familiar to all locomotive-engineers. Various means have been devised to overcome such difficulties. In order to overcome such inconveniences and difficulties, I connect with the brake-cylinder and the main brake-pipe an attachment constructed as follows: Two chambers, P and Q, which I will designate, respectively, as the "air-pressure chamber" and the "air or brake release chamber," are connected together by a bar, R. The air-pressure chamber is provided with upper and lower screw-caps, $P'$ $P^2$, and within it is fitted a valve, $P^3$, the stem $P^4$ of which passes through the upper cap, while to its lower face a leather cup-valve, $P^5$, is secured by means of the plate or washer *b* and screw *c*. A suitable spring, preferably a coiled spring, $P^6$, fits between the upper cap and top face of valve $P^3$, and exerts a downward pressure on the valve when compressed. The air-release chamber Q is preferably of smaller diameter than the pressure-chamber, and is provided with upper and lower caps, $Q'$ $Q^2$, which preferably screw into the chamber, the upper cap having a valve-seat, *d*, formed therein. Within the release-chamber is fitted a valve, $Q^3$, of any construction suitable for the purpose, but preferably of the form shown, with wings *e*, and having notches or ports *f* made in its periphery for the passage of steam when the valve is unseated, and with its stem $Q^4$, which passes through the upper cap, slightly flattened, as seen at *i*, on one or more sides for the whole or a portion of its length, to permit the escape of steam between the stem and the walls of the opening in the cap when the valve is unseated. A suitable spring, $Q^5$, preferably a spiral spring, fits between the lower cap and the valve and bears against both, so that it will hold the valve against its seat and assist in reseating it after the pressure which unseated it has been reduced or overcome. Normally the stems of both valves preferably protrude outside of their respective chambers, and bear against or are in such proximity thereto that they can be readily brought into contact with a beam, R′, pivoted or journaled by a pin or bolt, *g*, to a post or support, $R^2$, connected by a bolt, *h*, or other suitable means to the bar R. This beam-lever preferably stands at an inclination, as shown, with its longest arm between its support and the pressure-chamber; but if necessary it can be adjusted to bring the longest arm between the release-chamber and post, both the beam and connecting-bar being formed with a series of holes for the adjustment of both beam and post, or either.

The attachment, constructed as described, is applied by connecting the pressure-chamber P with the main brake-pipe by means of a pipe, S, entering the coupling A′ at one end, and the lower cap of the pressure-chamber at the other end, and the release-chamber with the brake-cylinder by means of a pipe, T, entering the lower cap of the pressure-chamber and connecting with the cock U, heretofore used for bleeding the brake-cylinder. It will be thus observed that the attachment can be applied to brakes already in use very readily and at a very small cost.

In operation, when the engineer, from his cab, exhausts the air from the main brake-pipe to put on the brakes, and the air passes from the auxiliary reservoir to the brake-cylinder through the connecting-pipe, the air at the time that it enters the brake-cylinder also passes from the same through pipe T into the release-chamber and presses against the valve therein, but cannot escape, because the valve is pressed against its seat, and hence the brake is applied as effectively as heretofore; but when the pressure is applied through the main pipe, as heretofore, to release the brakes, a sufficient portion of the air passes through pipe S into the pressure-chamber P to overcome the spring therein and press out the valve-stem so that it will bear against and elevate that end of the beam, thereby lowering the other end, and through it pressing down the stem and unseating the valve in the release-chamber, so as to effect an escape for the steam from the brake-cylinder through the release-chamber, and hence so long as the valve in the release-chamber is open and the pressure in the brake-cylinder is greater than the atmospheric pressure the air must escape from the cylinder, and consequently there can be no possibility of the piston sticking by reason of pressure of air in the cylinder preventing it from receding to its former position. It will be observed, too, that the operation of the release is under the absolute control of the engineer from the cab, and that the piston cannot stick, and that the necessity of bleeding the brake-cylinder, as heretofore in the construction of air-brakes such as described, is completely overcome.

The capacity of the two chambers and the tension of the springs and the leverage of the beams are such that when air is applied to take off the brakes the pressure of the air admitted to the pressure-chamber will easily overcome the pressure of the springs and of the air in the brake-cylinder.

I have, for the purposes of illustration and of showing how the releaser can be applied to the Westinghouse brake in common use, shown the releaser applied to such a brake with its ordinary appendages; but it will be understood that I do not limit myself to its use with the details of construction of the several parts of such a brake, as changes may be made in such parts and my invention still be serviceable for the purpose for which it was designed.

I have described the parts as applied to air-brakes; but it will of course be understood that the invention is not limited to such use where it can be used with other motive power.

Having thus described my invention and set forth its merits, what I claim is—

1. The combination, with the brake-cylinder and main brake-pipe, of a pressure-chamber communicating with the main pipe to receive air therefrom, a release-chamber communicating with the brake-cylinder, valves within the two chambers, and means for transmitting motion from one valve to the other, to unseat the latter and allow the exhaust of air from the brake-cylinder, substantially as set forth.

2. The combination, with the brake-cylinder and main brake-pipe, of a pressure-chamber communicating with the main pipe to receive air therefrom, a release-chamber communicating with the brake-cylinder, valves within the two chambers, and a beam for transmitting motion from one valve to the other, to unseat the latter and allow the exhaust of air from the brake-cylinder, substantially as set forth.

3. The combination, with the brake-cylinder and main brake-pipe, of a pressure-chamber communicating with the main pipe to receive air therefrom, a release-chamber communicating with the brake-cylinder, valves within the two chambers, springs acting on said valves to restore them to their normal positions after movement therefrom, and a beam for transmitting motion from one valve to the other, to unseat the latter and allow air to exhaust from the brake-cylinder, substantially as set forth.

4. The combination, with the main brake-pipe, the brake-cylinder, and means for controlling the passage of air from the main pipe to the brake-cylinder, of a pressure-chamber communicating with the main pipe, a release-chamber communicating with the brake-cylinder, valves within the two chambers, and means for transmitting motion from one valve to the other, to unseat the latter and allow the exhaust of air from the brake-cylinder, substantially as set forth.

5 The combination, with the main brake-pipe, the auxiliary reservoir, the brake-cylinder, and means for controlling the passage of air from the main pipe to the auxiliary reservoir and thence to the brake-cylinder, of a pressure-chamber communicating with the main pipe, a release-chamber communicating with the brake-cylinder, valves within the two chambers, and means for transmitting motion from one valve to the other, to unseat the latter and allow air to exhaust from the brake-cylinder, substantially as set forth.

6. The combination of the release chamber provided with a valve and escape-port, and constructed to receive air from the brake-cylinder, and a pressure-chamber provided with a valve connected with the valve in the release-chamber, and constructed to receive an inflowing agent to actuate its valve to transmit its movement to the valve in the release-chamber to unseat the same to open the escape-port, substantially as and for the purpose set forth.

7. The combination of the pressure chamber provided with the valve having a stem sliding through the end of the chamber, the release-chamber connected to the pressure-chamber without communicating therewith, and provided with the valve having a stem sliding through the end of the chamber, and the beam fulcrumed upon a suitable support and connecting the stems of the two valves, substantially as set forth.

8. The combination of the pressure-chamber and release-chamber, each provided with the detachable caps, the valve to each chamber provided with a stem passing through the end of the chamber, and the cross-beam fulcrumed on a suitable support, and having its opposite ends over the ends of the valve-stems, and adapted to receive momentum therefrom, substantially as set forth.

9. The combination of the pressure-chamber, the release-chamber, the valves within the two chambers having stems sliding through the ends of the chambers, the springs acting on the valves, and the beam connecting the stems of the valves, substantially as set forth.

10. The combination, with the pressure-chamber and the release-chamber and their valves, of the adjustable post or support, and the beam adapted to be adjusted on said post or support, substantially as set forth.

In testimony whereof I affix my signature in presence of two witnesses.

COLLUMBUS PHILLIPS.

Witnesses:
E. R. MORRIS,
CHAS. L. NEWMAN.